| (12) | United States Patent | (10) Patent No.: | US 12,425,562 B2 |
|---|---|---|---|
| | Huh et al. | (45) Date of Patent: | Sep. 23, 2025 |

(54) STEREOSCOPIC IMAGE DISPLAY DEVICE

(71) Applicant: SAMSUNG DISPLAY CO., LTD., Yongin-si (KR)

(72) Inventors: Su Jung Huh, Yongin-si (KR); Beom Shik Kim, Yongin-si (KR); Sung-Chan Jo, Yongin-si (KR); Young Chan Kim, Yongin-si (KR); Saet Byeol Shin, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 613 days.

(21) Appl. No.: 17/664,848

(22) Filed: May 24, 2022

(65) Prior Publication Data

US 2023/0054684 A1 Feb. 23, 2023

(30) Foreign Application Priority Data

Aug. 20, 2021 (KR) .................. 10-2021-0110430

(51) Int. Cl.
*H04N 13/305* (2018.01)
*H04N 13/315* (2018.01)

(52) U.S. Cl.
CPC ......... *H04N 13/305* (2018.05); *H04N 13/315* (2018.05)

(58) Field of Classification Search
CPC ........................... H04N 13/305; H04N 13/315
See application file for complete search history.

(56) References Cited

U.S. PATENT DOCUMENTS

| 5,576,867 | A | 11/1996 | Baur et al. | |
|---|---|---|---|---|
| 6,252,707 | B1 * | 6/2001 | Kleinberger | G02B 30/30 348/E13.058 |
| 7,760,430 | B2 | 7/2010 | Shetak et al. | |
| 8,582,062 | B2 | 11/2013 | Kim et al. | |
| 10,571,705 | B2 | 2/2020 | Zhang et al. | |
| 2013/0063687 | A1 * | 3/2013 | Jang | H04N 13/305 257/E31.127 |
| 2015/0124200 | A1 * | 5/2015 | Jiang | G02B 30/27 349/95 |
| 2016/0065954 | A1 * | 3/2016 | Son | G02B 30/52 348/51 |
| 2016/0161823 | A1 * | 6/2016 | Kim | G02F 1/134309 349/15 |
| 2019/0072774 | A1 * | 3/2019 | Jin | G02F 1/134309 |
| 2022/0004254 | A1 * | 1/2022 | Roberts | H04N 21/234363 |

FOREIGN PATENT DOCUMENTS

| KR | 10-1722661 | 4/2017 |
|---|---|---|
| KR | 10-1966233 | 4/2019 |

* cited by examiner

*Primary Examiner* — Mariam Qureshi
(74) *Attorney, Agent, or Firm* — F. CHAU & ASSOCIATES, LLC

(57) ABSTRACT

A stereoscopic image display device includes a display panel including a first display area and a second display area. A variable light-transmitting structure is disposed on the display panel and forms a blocking area blocking light from the display panel and a transmitting area transmitting the light from the display panel within the first display area by time division. A lens array is disposed on the variable light-transmitting structure and forms a light field by refracting the light from the display panel.

19 Claims, 10 Drawing Sheets

FIG. 3
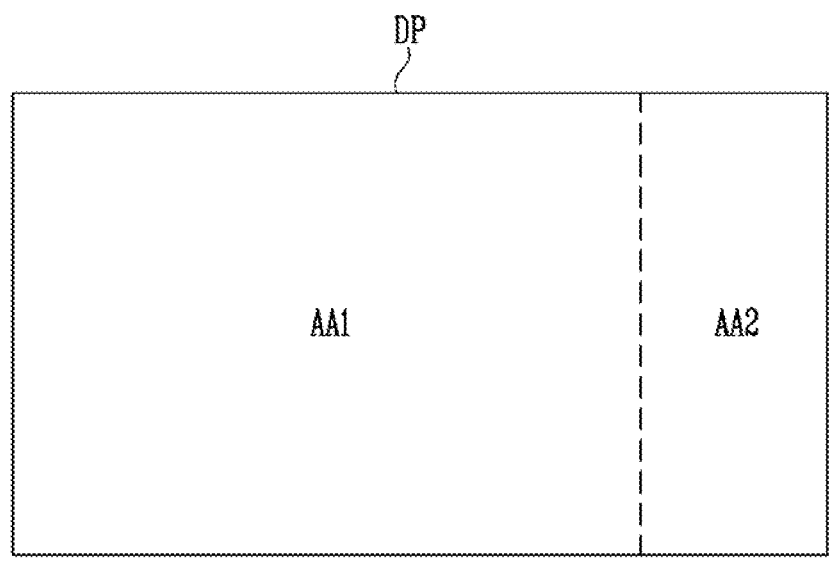
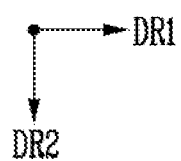

FIG. 6
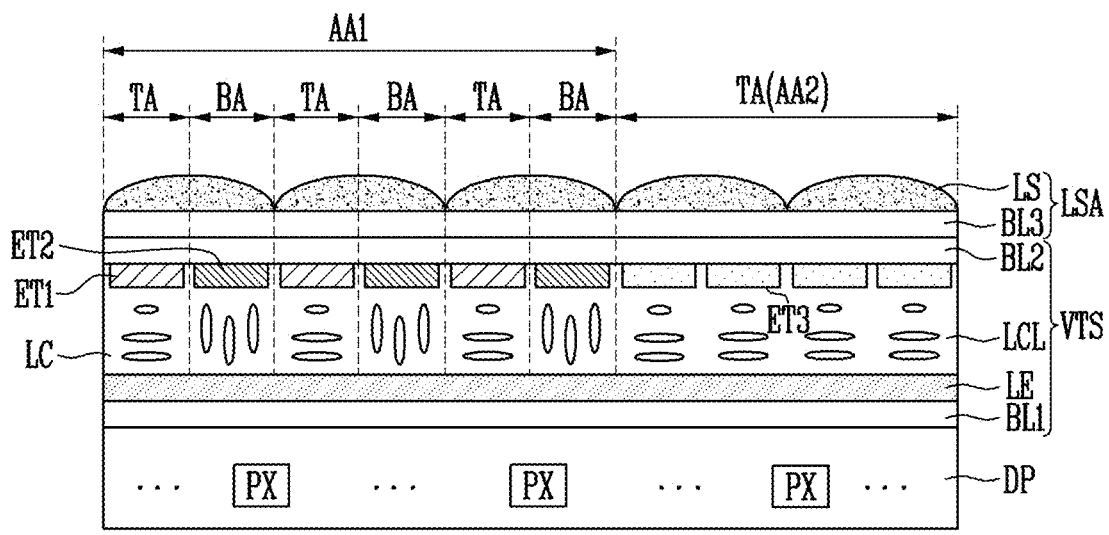
FIG. 7
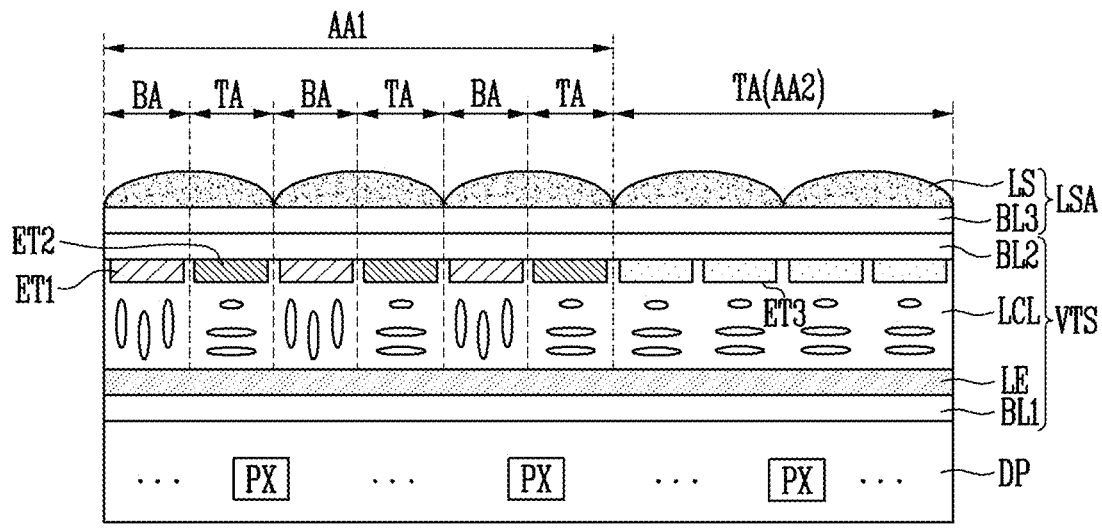

STEREOSCOPIC IMAGE DISPLAY DEVICE

CROSS-REFERENCE TO RELATED APPLICATION

The application claims priority to and the benefit of Korean Patent Application No. 10-2021-0110430, filed in the Korean Intellectual Property Office on Aug. 20, 2021, which is hereby incorporated by reference herein in its entirety.

TECHNICAL FIELD

The present invention relates to a display device, and more particularly, to a stereoscopic image display device for displaying a 3D image.

DISCUSSION OF THE RELATED ART

A stereoscopic image display device is a display device that can produce an image that appears to a viewer to be three-dimensional (3D) by providing a distinct image to the viewer's left and right eyes so that the viewer can view a stereoscopic image by binocular parallax between the left and right eyes.

While traditional stereoscopic image display devices required the use of 3D glasses to be worn by the viewer, some stereoscopic image display devices do not require 3D glasses to be worn. One approach to providing glasses-free stereoscopic image display utilizes a lenticular method that separates left eye and right eye images using a cylindrical lens array. Another approach uses a barrier method that separates left eye and right eye images using a barrier.

SUMMARY

A stereoscopic image display device includes a display panel including a first display area and a second display area. A variable light-transmitting structure is disposed on the display panel and forms a blocking area for blocking light from the display panel. A transmitting area transmits the light from the display panel within the first display area by time division. A lens array is disposed on the variable light-transmitting structure and forms a light field by refracting the light from the display panel.

The variable light-transmitting structure may transmit the light from the display panel within the second display area.

The variable light-transmitting structure may include a first base layer disposed on the display panel. A lower electrode layer may be disposed on the first base layer. An upper electrode layer may face the lower electrode layer and may include first electrodes and second electrodes alternately disposed in the first display area and third electrodes disposed in the second display area. A second base layer may be disposed on the upper electrode layer. A liquid crystal layer may be disposed between the lower electrode layer and the upper electrode layer and may include liquid crystal molecules whose alignment direction may be controlled based on a voltage applied to the upper electrode layer.

A driving voltage may be alternately applied to the first electrodes and the second electrodes.

One frame period in which an image is displayed may include a first period and a second period, and the driving voltage may be supplied to the first electrodes in the first period, and the driving voltage may be supplied to the second electrodes in the second period.

An area overlapping an electrode to which the driving voltage is supplied may be the blocking area, an area overlapping an electrode to which the driving voltage is not supplied may be the transmitting area, and the driving voltage might not be supplied to the third electrodes.

The lower electrode layer and the upper electrode layer may include a transparent conductive material.

Each lens of the lens array may overlap at least a portion of the first electrodes and at least a portion of the second electrodes.

The stereoscopic image display device may further include a light blocking pattern disposed under lenses of the lens array and overlapping a boundary between adjacent lenses.

The light blocking pattern may include a slit of an apodization structure for reducing diffraction at the boundary between the adjacent lenses.

The light blocking pattern may be in direct contact with the lenses.

The light blocking pattern may be disposed directly on the second base layer.

The light blocking pattern may be disposed under the second base layer and may be in contact with a portion of one of the first electrodes and a portion of one of the second electrodes.

The light blocking pattern may be disposed between the display panel and the first base layer.

A stereoscopic image display device includes a display panel including a first display area and a second display area. A variable light-transmitting structure is disposed on the display panel and forms a blocking area for blocking light from the display panel and a transmitting area for transmitting the light from the display panel within the first display area by time division. A lens array is disposed on the variable light-transmitting structure and forms a light field by refracting the light from the display panel. A light blocking pattern is disposed under lenses of the lens array and overlaps a boundary between adjacent lenses.

The light blocking pattern may include a slit of an apodization structure for reducing diffraction at the boundary between the adjacent lenses.

The variable light-transmitting structure may transmit the light from the display panel within the second display area.

The variable light-transmitting structure may include a first base layer disposed on the display panel. A lower electrode layer may be disposed on the first base layer. An upper electrode layer may face the lower electrode layer and may include first electrodes and second electrodes alternately disposed in a first direction in the first display area and third electrodes disposed in the second display area. A second base layer may be disposed on the upper electrode layer. A liquid crystal layer may be disposed between the lower electrode layer and the upper electrode layer and may include liquid crystal molecules whose alignment direction is controlled based on an applied voltage.

A driving voltage may be alternately applied to the first electrodes and the second electrodes.

Each of the lenses may overlap at least a portion of the first electrodes and at least a portion of the second electrodes.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts, wherein:

FIG. 3 is a diagram illustrating an example of a display panel included in the stereoscopic image display device according to embodiments of the present disclosure;

FIG. 6 is a diagram illustrating an example of an operation of the stereoscopic image display device in a first period of FIG. 5;

FIG. 7 is a diagram illustrating an example of an operation of the stereoscopic image display device in a second period of FIG. 5;

DETAILED DESCRIPTION OF THE ILLUSTRATED EMBODIMENTS

Figure 1:
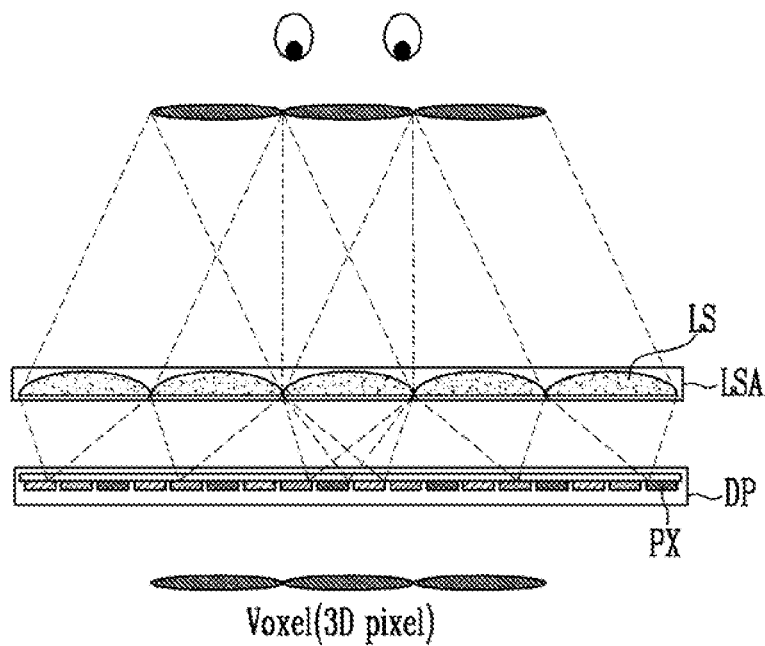
FIG. 1 is a diagram for explaining a stereoscopic image display device of a lens array method according to an embodiment of the present disclosure.

Hereinafter, embodiments of the present disclosure will be described in more detail with reference to the accompanying drawings. The same reference numerals may be used to represent the same or similar elements in the drawings, and to the extent that a detailed description of an element is omitted, it may be assumed that this element is at least similar to a corresponding element that has been described in detail elsewhere within the instant specification.

FIG. 1 is a diagram for explaining a stereoscopic image display device of a lens array method in accordance with an example embodiment of the present disclosure.

Referring to FIG. 1, a stereoscopic image display device may include a display panel DP and a lens array LSA.

The display panel DP may include pixels PX that each emit light to display an image. In an embodiment of the present disclosure, each of the pixels PX may output red light, green light, or blue light. However, this is an example, and the color of the light emitted from the pixels PX is not necessarily limited thereto, and various colors of light may be output to implement a desired color palette.

The lens array LSA may be disposed on the display panel DP and may include lenses LS that refract light incident from the pixels PX. For example, the lens array LSA may be implemented as a lenticular lens array, a micro lens array, or the like.

A light field display may be a 3D display that implements a stereoscopic image by forming a light field expressed as a vector distribution (intensity, direction) of light in space using a flat panel display and an optical element (for example, the lens array LSA). The light field display may provide a realistic and more natural 3D image than prior 3D display technologies and may be used in implementing augmented reality (AR), virtual reality (VR), and/or mixed reality (MR).

The light field may be implemented in various ways. For example, the light field may be formed by a method using multiple projectors to create a multi-directional light field, a method of controlling the direction of light using a diffraction grating, a method of controlling the direction and intensity (brightness) of light according to the combination of each pixel using two or more panels, a method of controlling the direction of light using a pinhole or barrier, a method of controlling the direction of refraction of light through a lens array, or the like.

In an embodiment, as shown in FIG. 1, the stereoscopic image display device of the lens array method may display a stereoscopic image (3D image) by forming the light field.

A series of pixels PX may be allocated to each lens LS, and the light emitted from each of the pixels PX may be refracted by the lens LS and may travel only in a specific direction to contribute to the light field expressed in the intensity and direction of light. When a viewer looks at the stereoscopic image display device within the light field formed in this way, the viewer can appreciate the stereoscopic effect of the corresponding image.

Image information according to a viewer's viewpoint within the light field may be defined and processed in units of voxels. A voxel may be understood as graphic information defining a predetermined point (or pixel) in a 3D space, e.g., a 3D pixel.

The resolution of a 2D image may be determined by the number (for example, density) of pixels for the same area. For example, when the number of pixels increases with respect to the same area, the resolution may increase. For example, the display panel DP having a high pixel density may be used to provide a high-resolution image.

Similarly, when the number of voxels at the same viewpoint through the lens array LSA increases, the resolution of the stereoscopic image may increase.

Figure 2:
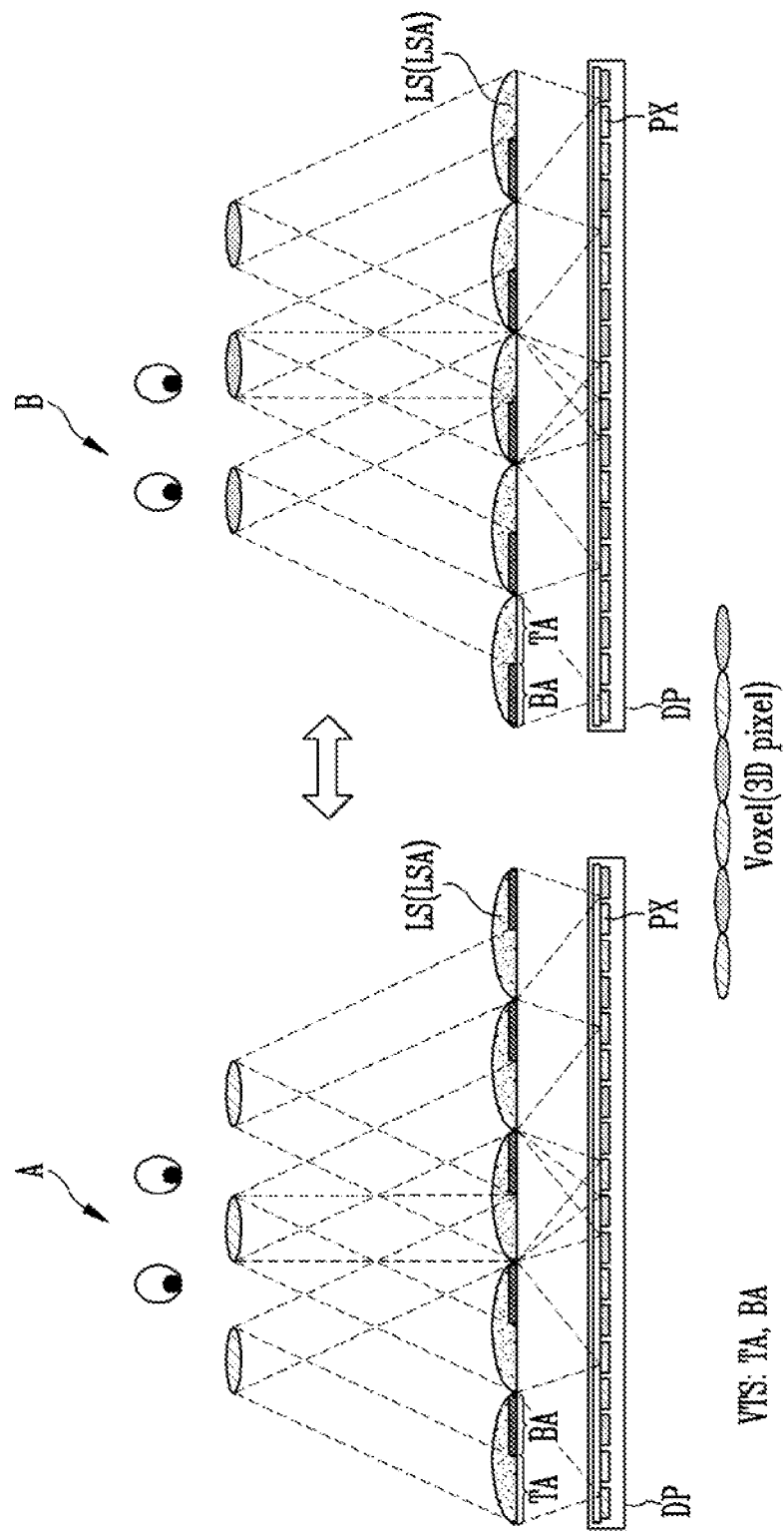
FIG. 2 is a diagram illustrating an operation of a stereoscopic image display device according to embodiments of the present disclosure.

FIG. 2 is a diagram illustrating an operation of a stereoscopic image display device according to embodiments of the present disclosure.

Referring to FIG. 2, a stereoscopic image display device may include a display panel DP, a variable light-transmitting structure VTS, and a lens array LSA.

The variable light-transmitting structure VTS may be disposed between the lens array LSA and the display panel DP. The variable light-transmitting structure VTS may form a blocking area BA for blocking light from the display panel DP and a transmitting area TA for transmitting light from the display panel DP by time division.

For example, the blocking area BA and the transmitting area TA may be formed to overlap one lens LS. The blocking area BA and the transmitting area TA may be formed to alternate with each other in position. In addition, a portion that was the blocking area BA at a first time point A may be switched to the transmitting area TA at a second time point B, and a portion that was the transmitting area TA at the first time point A may be switched to the blocking area BA at the second time point B. Such mutual switching of the transmitting area TA and the blocking area BA may be repeated while an image is displayed. When the mutual switching of the transmitting area TA and the blocking area BA proceeds within one frame, the viewer may recognize the image displayed at the first time point A and the image displayed at the second time point B as one image.

A portion of light (image information) reaching the viewer's viewpoint may be blocked by the blocking area BA. Accordingly, the size of the voxel may be smaller than the size of the voxel defined in the stereoscopic image display device of FIG. 1.

However, as shown in FIGS. 1 and 2, for the same viewpoint (or the same area), the number of voxels recognized by the viewer in the stereoscopic image display device of FIG. 2 may be greater than the number of voxels recognized by the viewer in the stereoscopic image display device of FIG. 1. Accordingly, the resolution of the stereoscopic image in the stereoscopic image display device of FIG. 2 may be higher than the resolution of the stereoscopic image in the stereoscopic image display device of FIG. 1.

Figure 4:
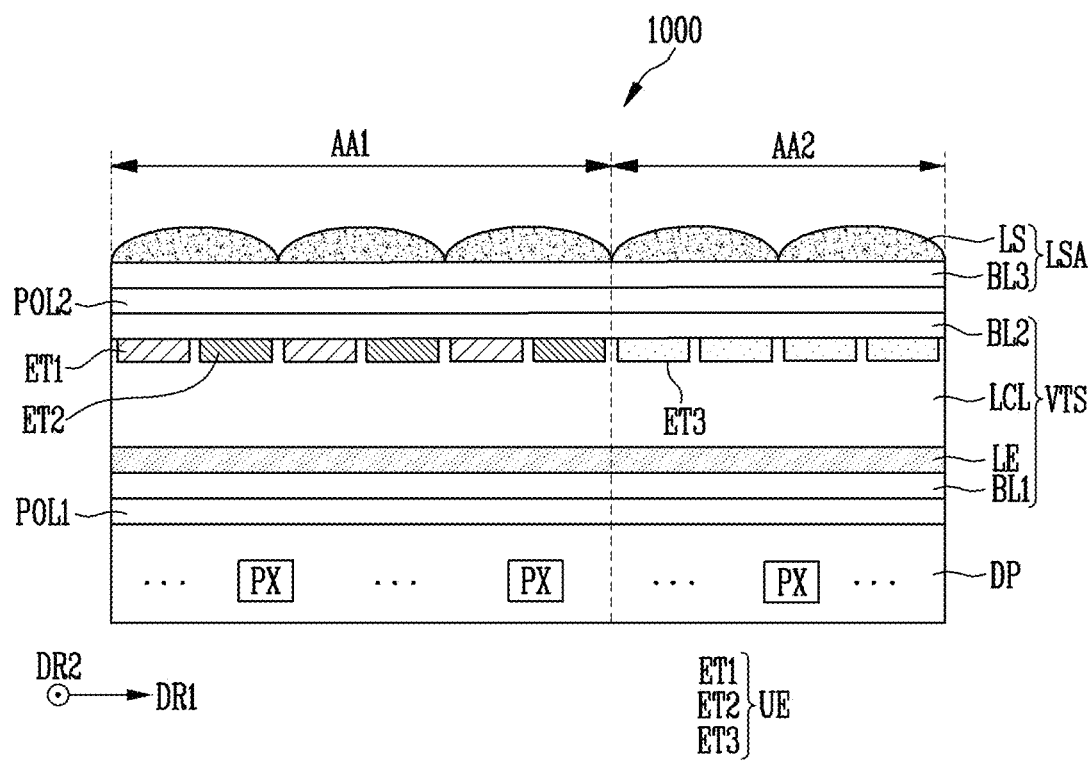
FIG. 4 is a diagram illustrating a stereoscopic image display device according to embodiments of the present disclosure.

FIG. 3 is a diagram illustrating an example of a display panel included in the stereoscopic image display device according to embodiments of the present disclosure. FIG. 4 is a diagram illustrating a stereoscopic image display device according to embodiments of the present disclosure.

Referring to FIGS. 1 to 4, a stereoscopic image display device 1000 may include a display panel DP, a variable light-transmitting structure VTS, and a lens array LSA.

The display panel DP may include pixels PX, and circuits and a driver for driving the pixels PX. All or at least a part of the display panel DP may be flexible (e.g., able to be bent, rolled, stretched, or folded to a noticeable degree without sustaining damage such as cracking).

In an embodiment, a pixel PX may include a self-light emitting element. For example, the self-light emitting element may include an organic light emitting diode (OLED) element, an inorganic light emitting element, or a light emitting element composed of an inorganic material and an organic material in combination.

However, this is an example, and the display panel DP may be implemented as a liquid crystal display panel, a plasma display panel, a display panel displaying an image using quantum dots, or the like. Where the pixels are not self-light emitting, a backlight device may be used.

The display panel DP may include a first display area AA1 and a second display area AA2. The first display area AA1 may overlap an area in which the blocking area BA and the transmitting area TA are alternately formed. The second display area AA2 may overlap only the transmitting area TA.

For example, the stereoscopic image based on the driving of FIG. 2 may be displayed in the first display area AA1, and the stereoscopic image based on the driving of FIG. 1 may be displayed in the second display area AA2. Accordingly, the resolution of the stereoscopic image in the first display area AA1 may be higher than the resolution of the stereoscopic image in the second display area AA2.

FIG. 3 shows an embodiment in which the first display area AA1 and the second display area AA2 are divided based on a first direction DR1, but the invention is not necessarily limited thereto. For example, the first display area AA1 and the second display area AA2 may be divided based on a second direction DR2. Alternatively, the display panel DP may include a plurality of first display areas AA1 and a plurality of second display areas AA2, and the first display area AA1 may at least partially surround the second display area AA2.

In addition, a portion where a relatively high resolution stereoscopic image is to be displayed may be set as the first display area AA1, and a portion to which a relatively low resolution may be applied may be set as the second display area AA2.

In an embodiment, the display panel DP may have a structure in which a backplane structure forming a pixel circuit, a light emitting structure forming a light emitting element, and an encapsulation structure are sequentially stacked.

In an embodiment, a first polarization layer POL1 may be disposed on the display panel DP. The first polarization layer POL1 may serve as an anti-reflection layer. For example, the first polarization layer POL1 may reduce reflectance of external light incident from outside of the display device 1000.

In an embodiment, the first polarization layer POL1 may include a phase retarder and a polarizer. The phase retarder may be a film type or a liquid crystal coating type, and may include a half-wave plate ($\lambda/2$) phase retarder and/or a quarter-wave plate ($\lambda/4$) phase retarder. The polarizer may also be a film type or a liquid crystal coating type polarizer.

The variable light-transmitting structure VTS may be disposed on the display panel DP. The variable light-transmitting structure VTS may form the blocking area BA and the transmitting area TA within the first display area AA1 by time division. In an embodiment, the variable light-transmitting structure VTS may form the transmitting area TA in the second display area AA2.

The variable light-transmitting structure VTS may include a first base layer BL1, a lower electrode layer LE, a liquid crystal layer LCL, an upper electrode layer UE (as described below, the UE includes first electrodes ET1, second electrodes ET2, and third electrodes ET3), and a second base layer BL2.

The first base layer BL1 may be disposed on the display panel DP or the first polarization layer POL1. The first base layer BL1 may be formed of a transparent insulating material. For example, the first base layer BL may be an organic material such as polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (SAC), and/or cellulose acetate propionate (CAP).

In an embodiment, the first base layer BL1 may be made of an inorganic material. For example, the first base layer BL1 may include a silicon nitride layer, a silicon oxynitride layer, a silicon oxide layer, a titanium oxide layer, and/or an aluminum oxide layer.

The lower electrode layer LE may be disposed on the first base layer BL1. The lower electrode layer LE may include a transparent conductive material such as ITO. A reference voltage serving as a reference for turning on/off the driving of the liquid crystal layer LCL may be supplied to the lower electrode layer LE.

In an embodiment, a lower alignment layer and/or a lower insulating layer covering the lower electrode layer LE may be further disposed.

The second base layer BL2 may face the first base layer BL1 with the liquid crystal layer LCL interposed therebetween. The upper electrode layer UE may be disposed on a lower surface of the second base layer BL2. The second base layer BL2 may be formed of the above-described transparent insulating material or a similar material.

The upper electrode layer UE may be disposed to face the lower electrode layer LE. The upper electrode layer UE may include first electrodes ET1, second electrodes ET2, and third electrodes ET3. The upper electrode layer UE may include a transparent conductive material such as ITO.

In an embodiment, the first electrodes ET1 and the second electrodes ET2 may be alternately disposed in the first direction DR1 in the first display area AA1. The third electrodes ET3 may be disposed in the second display area AA2.

In an embodiment, a driving voltage may be alternately applied to the first electrodes ET1 and the second electrodes ET2. Also, the driving voltage might not be supplied to the third electrodes ET3. An electric field may be formed in the liquid crystal layer LCL between the upper electrode layer UE and the lower electrode layer LE depending on the voltage level of the driving voltage or whether the driving voltage is applied, and the alignment direction of liquid crystal molecules included in the liquid crystal layer LCL may be controlled.

In an embodiment, an upper alignment layer and/or an upper insulating layer may be further disposed between the upper electrode layer UE and the liquid crystal layer LCL.

The liquid crystal layer LCL may be disposed between the lower electrode layer LE and the upper electrode layer UE. The liquid crystal layer LCL may include the liquid crystal molecules whose alignment direction is controlled according to a voltage applied to the upper electrode layer UE.

For example, when the driving voltage is supplied to a first electrode ET1, the liquid crystal molecules in an area facing the first electrode ET1 may be arranged substantially perpendicular to the first base layer BL1, and the corresponding area may be the blocking area. At the same time, the driving voltage might not be supplied to a second electrode ET2. Accordingly, the liquid crystal molecules in an area facing the second electrode ET2 may be arranged substantially parallel to the first base layer BL1, and the corresponding area may be the transmitting area.

In an embodiment, the driving voltage might not be supplied to a third electrode ET3. Accordingly, the transmitting area may be formed in the second display area AA2.

In an embodiment, the liquid crystal layer LCL may be driven in a twisted nematic (TN) liquid crystal mode having a V2 phase difference. However, this is only an example, and the liquid crystal layer LCL may be driven in a liquid crystal mode such as vertical alignment (VA), optical compensated bend (OCB), or electrically controlled birefringence (ECB).

In an embodiment, a second polarization layer POL2 may be disposed on the variable light-transmitting structure VTS. The second polarizing layer POL2 may be formed of a film type or a liquid crystal coating type.

In an embodiment, a polarization axis of the first polarization layer POL1 and a polarization axis of the second polarization layer POL2 may be orthogonal to each other. Accordingly, light blocking in the blocking area BA can be maximized.

However, this is only an example, and the display device 1000 may have only one of the first and second polarization layers POL1 and POL2, or both of the first and second polarization layers POL1 and POL2 may be omitted.

The lens array LSA may be disposed on the variable light-transmitting structure VTS. The lens array LSA may form the light field by refracting the light from the display panel DP. For example, a stereoscopic image may be implemented by the lens array LSA.

The lens array LSA may include a third base layer BL3 disposed on the second base layer BL2 or the second polarization layer POL2 and lenses LS formed on the third base layer BL3.

The third base layer BL3 may be formed of a transparent insulating material.

In an embodiment, the lens array LSA may include a lens LS having a semi-cylindrical shape (for example, a lenticular lens) extending in the second direction DR2. For example, when viewed on a plane, the lenticular lens may have a rectangular shape elongated in the second direction DR2.

Alternatively, the lens array LSA may include a plurality of micro lenses. When viewed on a plane, the micro lenses may have a shape such as a hexagon, a circle, or an ellipse.

Figure 5:
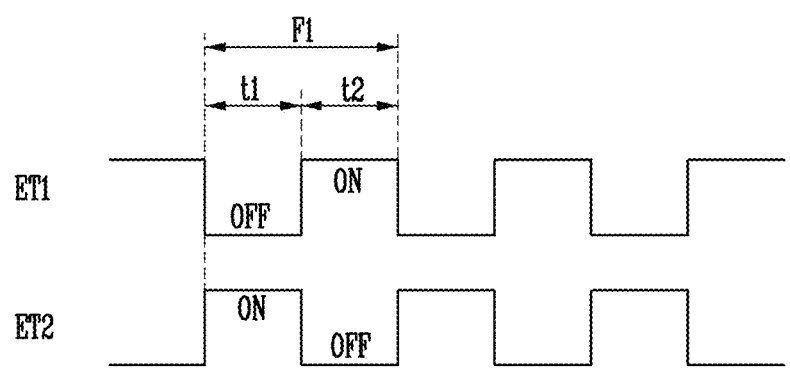
FIG. 5 is a diagram illustrating an example of signals supplied to a first electrode and a second electrode included in the stereoscopic image display device of FIG. 4.

FIG. 5 is a diagram illustrating an example of signals supplied to a first electrode and a second electrode included in the stereoscopic image display device of FIG. 4. FIG. 6 is a diagram illustrating an example of an operation of the stereoscopic image display device in a first period of FIG. 5. FIG. 7 is a diagram illustrating an example of an operation of the stereoscopic image display device in a second period of FIG. 5.

Referring to FIGS. 1 to 7, the driving voltage may be alternately supplied to the first electrode ET1 and the second electrode ET2.

In FIGS. 6 and 7, at least one of the first and second polarization layers POL1 and POL2 of FIG. 4 may be further included in the stereoscopic image display device.

In FIG. 5, the driving voltage may be a high level voltage (indicated as ON) of signals supplied to the first electrode ET1 and the second electrode ET2.

Also, as shown in FIG. 5, the driving voltage might not be supplied to the second electrode ET2 when the driving voltage is supplied to the first electrode ET1, and the driving voltage might not be supplied to the first electrode ET1 when the driving voltage is supplied to the second electrode ET2.

In an embodiment, one frame period F1 during which an image is displayed may include a first period t1 and a second period t2. For example, when an image frame is driven at 60 Hz, the frame period F1 may be about 16.7 ms. Here, each of the first period t1 and the second period t2 may be about 8.3 ms, which is half of the frame period F1. When the image frame is driven at 120 Hz, the frame period F1 may be about 8.3 ms, and each of the first period t1 and the second period t2 may be about 4.17 ms.

Since the first period t1 and the second period t2 are quickly switched, the output image may be recognized as a natural stereoscopic image by the viewer.

In an embodiment, the driving voltage may be supplied to the second electrode ET2 in the first period t1, and the driving voltage may be supplied to the first electrode ET1 in the second period t2. Also, the supply of the driving voltage to the first electrode ET1 may be stopped in the first period t1, and the supply of the driving voltage to the second electrode ET2 may be stopped in the second period t2. As the frame elapses, the driving in the first period t1 and the second period t2 may be repeated.

FIG. 6 shows the driving of the stereoscopic image display device 1000 in the first period t1. When the supply of the driving voltage to the first electrode ET1 is stopped, an electric field might not be formed by the first electrode ET1, and liquid crystal molecules LC may be arranged substantially parallel to the first base layer BL1. Accordingly, the liquid crystal molecules LC in the area facing the first electrode ET1 may pass the light from the display panel DP to the lens array LSA, and the transmitting area TA may be formed.

When the driving voltage is supplied to the second electrode ET2, an electric field may be formed between the second electrode ET2 and the lower electrode layer LE, and the liquid crystal molecules LC corresponding thereto may be arranged in a direction perpendicular to the first base layer BL1. The liquid crystal molecules LC in the area facing the second electrode ET2 may block the light from the display panel DP, and the blocking area BA may be formed.

Accordingly, the transmitting area TA and the blocking area BA may be alternately formed along the first direction DR1 in the first display area AA1.

FIG. 7 shows the driving of the stereoscopic image display device 1000 in the second period t2. The driving voltage may be supplied to the first electrode ET1 to form the blocking area BA in the area facing the first electrode ET1. In addition, the supply of the driving voltage to the second electrode ET2 may be stopped to form the transmitting area TA in the area facing the second electrode ET2.

Accordingly, the blocking area BA and the transmitting area TA may be switched to each other in the first period t1 and the second period t2.

The driving voltage might not be supplied to the third electrode ET3 for an entire period, and the second display area AA2 may be driven as the transmitting area TA.

In an embodiment, each lens LS may overlap at least a portion of the first electrode ET1 and at least a portion of the second electrode ET2. Accordingly, as shown in FIGS. 1 and 2, the size of individual voxels formed through the lens LS of the first display area AA1 may be smaller than the size of voxels formed through the lens LS of the second display area AA2. However, since the number of voxels per unit area in the first display area AA1 may be greater than the number of voxels per unit area in the second display area AA2, in the stereoscopic image display device 1000 of a light field method using the lens array LSA, the resolution of the stereoscopic image in the first display area AA1 may be increased.

In addition, since the image processing load of the second display area AA2 having a relatively low resolution may be lower than that of the first display area AA1, image processing speed may be increased, power consumption may be reduced, and cost to drive the first display area AA1 may be reduced, only in a partial area of the stereoscopic image display device 1000.

FIGS. 8 to 11 are diagrams illustrating examples of an arrangement of the first electrode and the second electrode included in the stereoscopic image display device of FIG. 4.

Referring to FIGS. 8 to 11, the first electrodes ET1 and the second electrodes ET2 may be alternately disposed.

Figure 8:
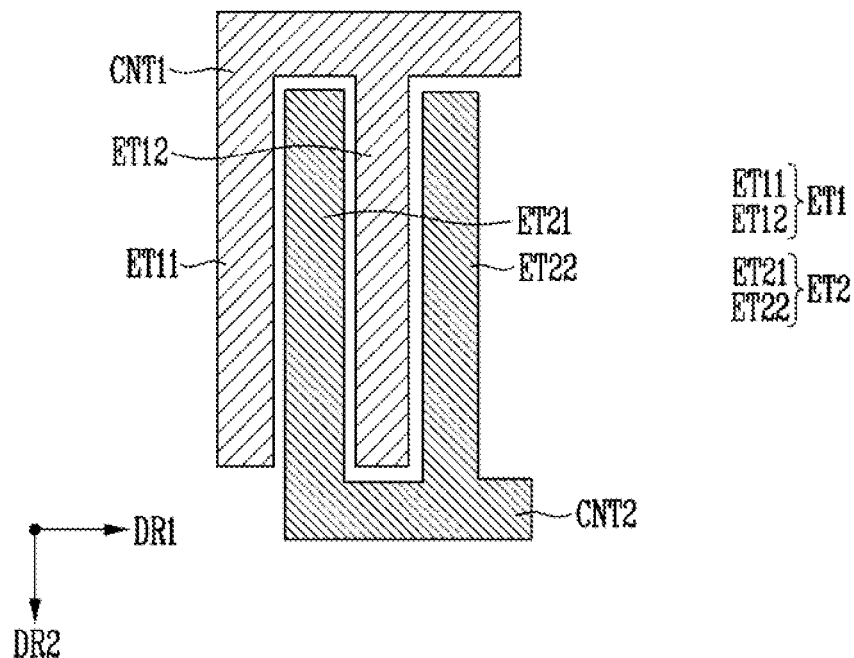
FIGS. 8 to 11 are diagrams illustrating examples of an arrangement of the first electrode and the second electrode included in the stereoscopic image display device of FIG. 4.
Figure 9:
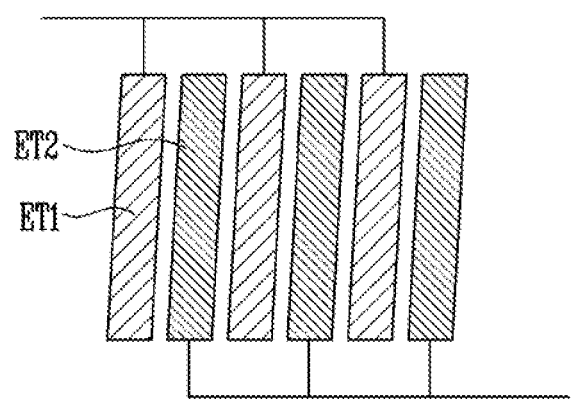

FIGS. 8 and 9 show a first electrode ET1 and a second electrode ET2 corresponding to a lenticular lens array having a semi-cylindrical shape.

In an embodiment, as shown in FIG. 8, the first electrode ET1 and the second electrode ET2 may extend in the second direction DR2 and may be alternately arranged along the first direction DR1. For example, a first-second electrode ET21 may be disposed between a first-first electrode ET11 and a second-first electrode ET12. Also, a second-second electrode ET22 may be disposed on the other side of the second-first electrode ET12. Also, at least a portion of the first-first electrode ET11 and at least a portion of the first-second electrode ET21 may overlap one lens.

The first-first electrode ET11 and the second-first electrode ET12 may be connected to each other through a first connection part CNT1. Accordingly, the same signal (voltage) may be supplied to the first-first electrode ET11 and the second-first electrode ET12.

The first-second electrode ET21 and the second-second electrode ET22 may be connected to each other through a second connection part CNT2. Accordingly, the same signal (voltage) may be supplied to the first-second electrode ET21 and the second-second electrode ET22.

In an embodiment, as shown in FIG. 9, the first electrode ET1 and the second electrode ET2 may be inclined with respect to the second direction DR2.

Figure 10:
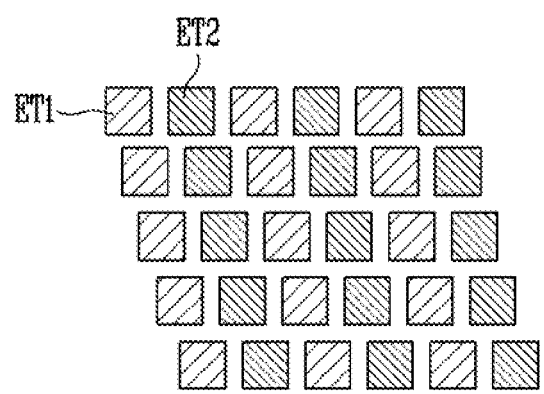
Figure 11:
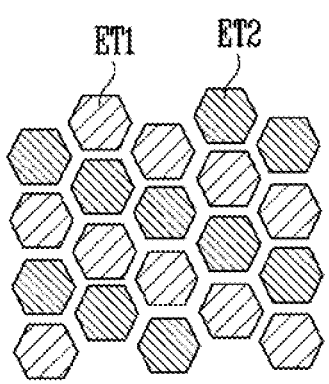

FIGS. 10 and 11 show the first electrode ET1 and the second electrode ET2 corresponding to a micro lens array. As shown in FIGS. 10 and 11, the planar shape and arrangement of the first electrode ET1 and the second electrode ET2 may be determined according to the planar shape of each lens included in the micro lens array.

As such, the shapes of the first and second electrodes ET1 and ET2 may be determined according to the shape of the lens array LSA.

Figure 12:
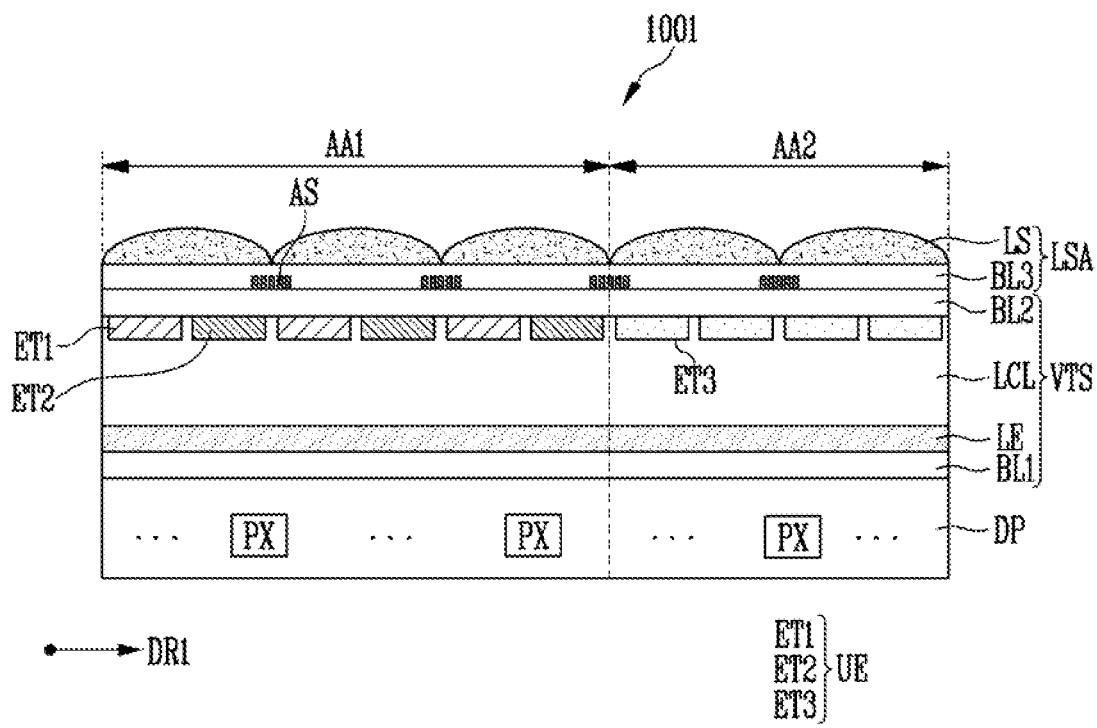
FIG. 12 is a diagram illustrating a stereoscopic image display device according to embodiments of the present disclosure.

FIG. 12 is a diagram illustrating a stereoscopic image display device according to embodiments of the invention.

In FIG. 12, the same reference numerals are used for the components described with reference to FIG. 4, and to the extent that a detailed description of an element is omitted, it can be assumed that the element is at least similar to corresponding elements that have been described elsewhere within the instant specification. Also, a stereoscopic image display device 1001 of FIG. 12 may have substantially the same or similar configuration as the stereoscopic image display device 1000 of FIG. 4, except for the configuration of a light blocking pattern AS.

Referring to FIG. 12, the stereoscopic image display device 1001 may include a display panel DP, a variable light-transmitting structure VTS, a lens array LSA, and the light blocking pattern AS.

At a boundary between the lenses LS, the influence of interference due to diffraction of the emitted light may be relatively large, and display quality may be deteriorated due to crosstalk of the stereoscopic image according to the interference. In addition, image distortion may be additionally recognized due to lens aberration or the like. In order to reduce such crosstalk and image distortion, the light blocking pattern AS may be disposed.

In an embodiment, the light blocking pattern AS may be disposed under the lens array LSA. For example, the light blocking pattern AS may be disposed on the second base layer BL2 and may be formed by a patterning method.

The light blocking pattern AS may overlap a boundary between adjacent lenses LS. The light blocking pattern AS may absorb or block light emitted from a lower portion. Also, the light blocking pattern AS may overlap a portion of the first electrode ET1 and a portion of the second electrode ET2 adjacent to each other.

In an embodiment, a width of the light blocking pattern AS (for example, a width in the first direction DR1) may be about 1% to about 2% of a pitch of the lens LS.

In an embodiment, the light blocking pattern AS may include an organic light blocking material. For example, the organic light blocking material may include carbon black (CB) and/or titanium black (TiBK), but the present disclosure is not necessarily limited thereto.

A slit may be formed between light blocking patterns AS adjacent to each other, and optical interference such as new diffraction may be generated by the slit. Accordingly, a structure for reducing display quality deterioration due to the slit of the light blocking patterns AS may be used.

In an embodiment, the light blocking pattern AS may include fine slits having an apodization structure for reducing diffraction at the boundary between adjacent lenses. For example, the light blocking pattern AS having the apodization structure may reduce a high-order diffraction image, and may further reduce interference due to diffraction and crosstalk due to lens aberration.

Figure 13:
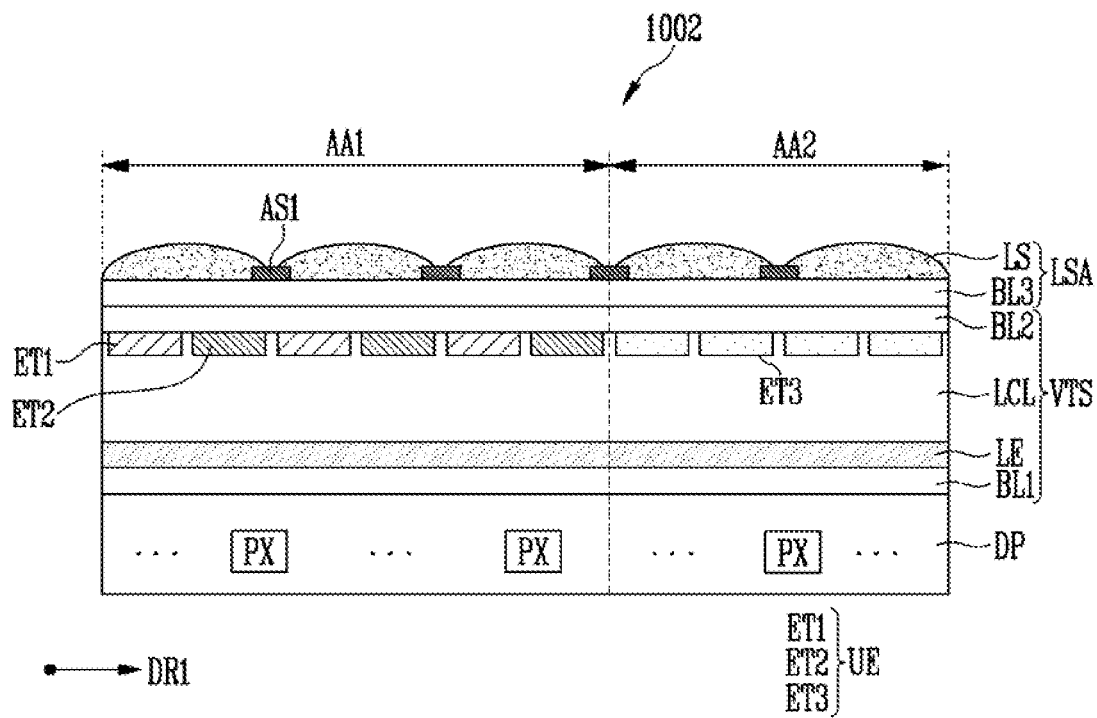
FIGS. 13 to 15 are diagrams illustrating examples of the stereoscopic image display device of FIG. 12.
Figure 14:
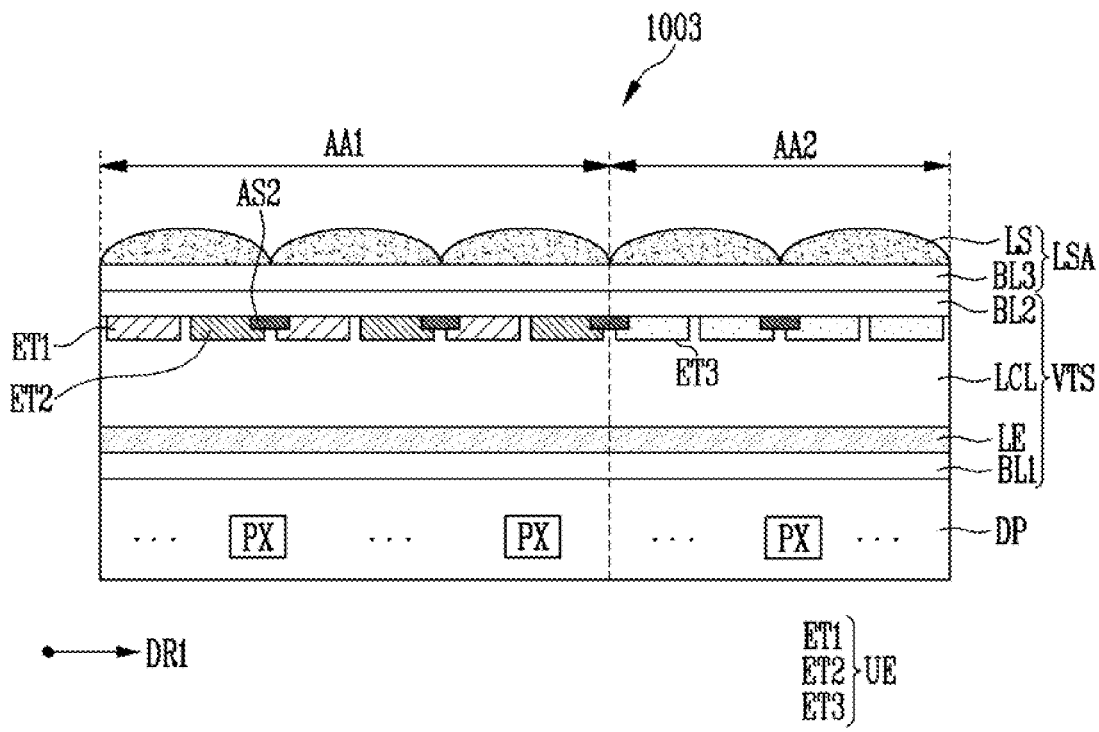
Figure 15:
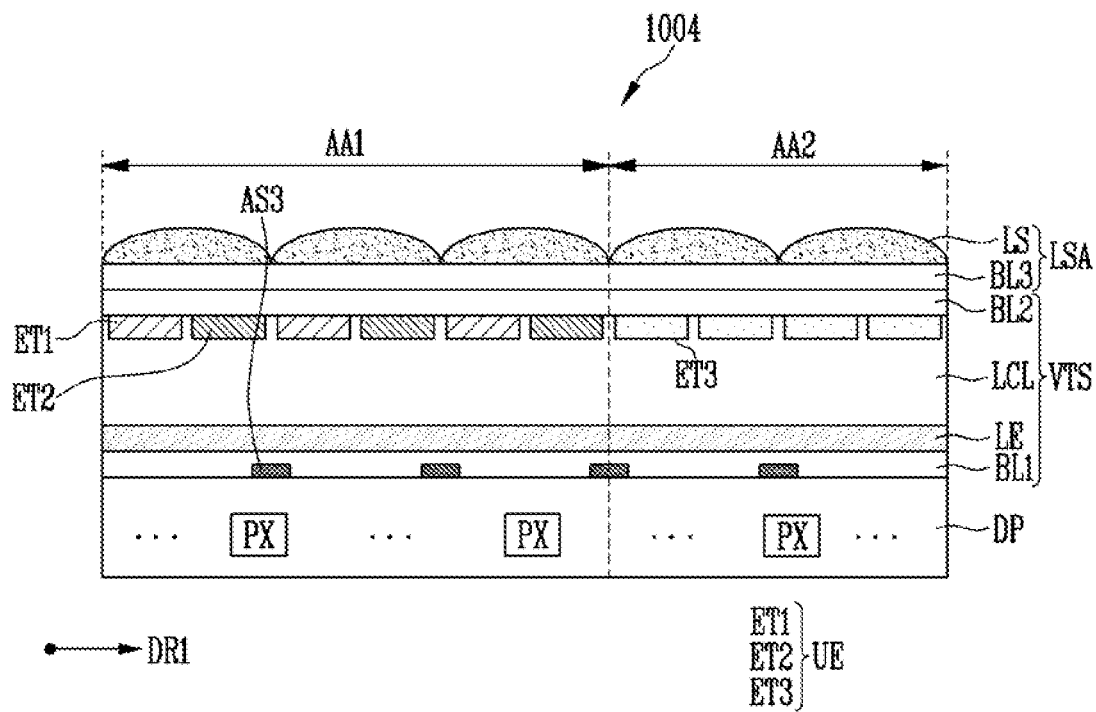

FIGS. 13 to 15 are diagrams illustrating examples of the stereoscopic image display device of FIG. 12.

In FIGS. 13 to 15, the same reference numerals may be used for the components described with reference to FIG. 12, and to the extent that a detailed description of an element is omitted, it can be assumed that the element is at least similar to corresponding elements that have been described elsewhere within the instant specification. In addition, stereoscopic image display devices 1002, 1003, and 1004 of FIGS. 13 to 15 may have substantially the same or similar configuration as the stereoscopic image display device 1001 of FIG. 12, except for the configuration/positions of light blocking patterns AS1, AS2, and AS3.

Referring to FIGS. 13 to 15, each of the stereoscopic image display devices 1002, 1003, and 1004 may include a display panel DP, a variable light-transmitting structure VTS, a lens array LSA, and a light blocking pattern AS1, AS2, or AS3.

In an embodiment, as shown in FIG. 13, the light blocking pattern AS1 may be disposed on the third base layer BL3. The light blocking pattern AS1 may be patterned on the third base layer BL3. The lenses LS may be formed on the third base layer BL3 on which the light blocking pattern AS1 is formed. Accordingly, the light blocking pattern AS1 may be in direct contact with the lenses.

In an embodiment, as shown in FIG. 14, the light blocking pattern AS2 may be disposed under the second base layer BL2. The light blocking pattern AS2 may be in contact with a portion of the first electrode ET1 and a portion of the second electrode ET2.

For example, after the light blocking pattern AS2 is patterned on the rear surface of the second base layer BL2, the first to third electrodes ET1, ET2, and ET3 may be patterned.

In an embodiment, as shown in FIG. 15, the light blocking pattern AS3 may be disposed between the display panel DP and the first base layer BL1. For example, the light blocking pattern AS3 may be patterned on an encapsulation layer of the display panel DP.

As such, the light blocking patterns AS, AS1, AS2, and AS3 may be selectively formed at various positions depending on process conditions and the like.

Figure 16:
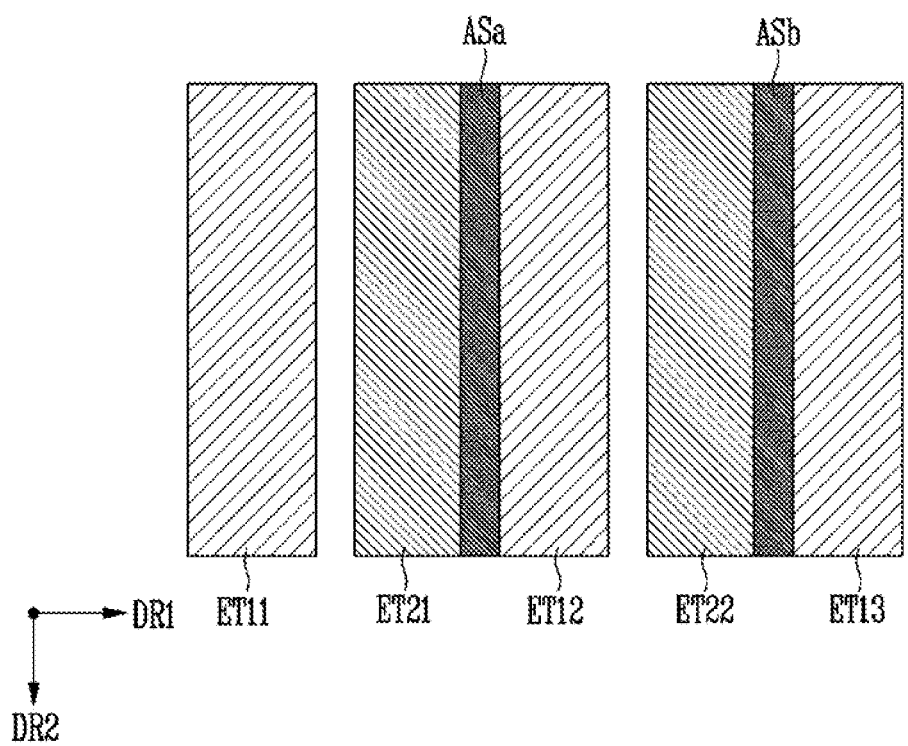
FIG. 16 is a diagram illustrating an example of an arrangement of a first electrode, a second electrode, and a light blocking pattern included in the stereoscopic image display device of FIG. 12.

FIG. 16 is a diagram illustrating an example of an arrangement of a first electrode, a second electrode, and a light blocking pattern included in the stereoscopic image display device of FIG. 12.

Referring to FIGS. 12 and 16, each of light blocking patterns ASa and ASb may be disposed to overlap boundaries of the lenses LS. When viewed on a plane, the light blocking patterns ASa and ASb may be represented as shown in FIG. 16.

For example, the first-first electrode ET11 and the first-second electrode ET21 may overlap a first lens LS (for example, a first lenticular lens), and the second-first electrode ET12 and the second-second electrode ET22 may overlap a second lens. A third first electrode ET13 may overlap a third lens.

Accordingly, a boundary (for example, a first boundary) between the first lens and the second lens may exist between the first-second electrode ET21 and the second-first electrode ET12, and a boundary (for example, a second boundary) between the second lens and the third lens may exist between the second-second electrode ET22 and the third-first electrode ET13.

A first blocking pattern ASa may overlap the first boundary. The first blocking pattern ASa may extend along the second direction DR2. Also, the first blocking pattern ASa may overlap a portion of the first-second electrode ET21 and a portion of the second-first electrode ET12.

A second light blocking pattern ASb may overlap the second boundary. The second blocking pattern ASb may extend along the second direction DR2. Also, the second light blocking pattern ASb may overlap a portion of the second-second electrode ET22 and a portion of the third-first electrode ET13.

As described above, the stereoscopic image display device according to embodiments of the invention may include the first display area in which the blocking area and the transmitting area are switched. Accordingly, in implementing the stereoscopic image using the light field formed by the lens array, a load need not be excessively increased when stereoscopic image data is processed, and the resolution of the stereoscopic image in the first display area may be increased.

In addition, the stereoscopic image display device may include the light blocking pattern overlapping the boundary of the lenses included in the lens array. Therefore, image distortion such as crosstalk due to diffraction and interference of light output at the boundary between the lenses can be reduced.

However, effects of the invention are not necessarily limited to the above-described effects, and may be variously extended without departing from the spirit and scope of the present disclosure.

As described above, embodiments of the present disclosure have been described with reference to the drawings. However, those skilled in the art will appreciate that various modifications and changes can be made to the embodiments described herein without departing from the spirit and scope of the present disclosure.

What is claimed is:

1. A stereoscopic image display device, comprising:
   a display panel including a first display area and a second display area;
   a variable light-transmitting structure disposed on the display panel and forming a blocking area blocking light from the display panel and a transmitting area transmitting the light from the display panel within the first display area; and
   a lens array disposed on the variable light-transmitting structure and refracting the light from the display panel to form a light field,
   wherein, in the first display area, the blocking area is configured to alternate between blocking the light from the display panel and transmitting the light from the display panel according to time and, in the second display area, the variable light-transmitting structure is configured to always transmit light from the display panel.

2. The stereoscopic image display device of claim 1, wherein the variable light-transmitting structure comprises:
   a first base layer disposed on the display panel;
   a lower electrode layer disposed on the first base layer;
   an upper electrode layer facing the lower electrode layer and including first electrodes and second electrodes alternately disposed in the first display area and third electrodes disposed in the second display area;
   a second base layer disposed on the upper electrode layer; and
   a liquid crystal layer disposed between the lower electrode layer and the upper electrode layer and including liquid crystal molecules, wherein an alignment direction of the liquid crystal molecules is controlled based on a voltage applied to the upper electrode layer.

3. The stereoscopic image display device of claim 2, wherein a driving voltage is alternately applied to the first electrodes and the second electrodes.

4. The stereoscopic image display device of claim 3, wherein one frame period in which an image is displayed includes a first period and a second period that does not overlap the first period, and
wherein the driving voltage is supplied to the first electrodes in the first period, and the driving voltage is supplied to the second electrodes in the second period.

5. The stereoscopic image display device of claim 3, wherein an area overlapping an electrode to which the driving voltage is supplied is the blocking area, and an area overlapping an electrode to which the driving voltage is not supplied is the transmitting area, and
wherein the driving voltage is not supplied to any of the third electrodes.

6. The stereoscopic image display device of claim 2, wherein the lower electrode layer and the upper electrode layer each include a transparent conductive material.

7. The stereoscopic image display device of claim 2, wherein each lens of the lens array overlaps at least a portion of the first electrodes and at least a portion of the second electrodes.

8. The stereoscopic image display device of claim 2, further comprising:
a light blocking pattern disposed under lenses of the lens array and overlapping a boundary between adjacent lenses.

9. The stereoscopic image display device of claim 8, wherein the light blocking pattern includes a slit of an apodization structure reducing diffraction at the boundary between the adjacent lenses.

10. The stereoscopic image display device of claim 8, wherein the light blocking pattern is in direct contact with the lenses.

11. The stereoscopic image display device of claim 8, wherein the light blocking pattern is disposed directly on the second base layer.

12. The stereoscopic image display device of claim 8, wherein the light blocking pattern is disposed under the second base layer and is in contact with both a portion of one of the first electrodes and a portion of one of the second electrodes.

13. The stereoscopic image display device of claim 8, wherein the light blocking pattern is disposed between the display panel and the first base layer.

14. An electronic device including a stereoscopic image display device, the stereoscopic image display device comprising:
a display panel including a first display area and a second display area;
a variable light-transmitting structure disposed on the display panel and forming a blocking area blocking light from the display panel and a transmitting area transmitting the light from the display panel within the first display area;
a lens array disposed on the variable light-transmitting structure and refracting the light from the display panel to form a light field; and
a light blocking pattern disposed under the lens array and overlapping a boundary between adjacent lenses of the lens array,
wherein the blocking area is configured to alternate between blocking the light from the display panel and transmitting the light from the display panel within the first display area according to time,
wherein the transmitting area is configured to always transmit light from the display panel within the second display area, and
wherein the second display area has a lower resolution output than the first display area.

15. The electronic device of claim 14, wherein the light blocking pattern includes a slit of an apodization structure reducing diffraction at the boundary between the adjacent lenses.

16. The electronic device of claim 14, wherein the variable light-transmitting structure transmits the light from the display panel within the second display area.

17. The electronic device of claim 16, wherein the variable light-transmitting structure comprises:
a first base layer disposed on the display panel;
a lower electrode layer disposed on the first base layer;
an upper electrode layer facing the lower electrode layer and including first electrodes and second electrodes alternately disposed in a first direction in the first display area and third electrodes disposed in the second display area;
a second base layer disposed on the upper electrode layer; and
a liquid crystal layer disposed between the lower electrode layer and the upper electrode layer and including liquid crystal molecules,
wherein an alignment direction of the liquid crystal molecules is controlled based on an applied voltage.

18. The electronic device of claim 17, wherein a driving voltage is alternately applied to the first electrodes and the second electrodes.

19. The electronic device of claim 17, wherein each of the lenses overlaps at least a portion of the first electrodes and at least a portion of the second electrodes.

* * * * *